United States Patent [19]

Mancini

[11] 4,340,343

[45] Jul. 20, 1982

[54] FOOD PREPARATION MACHINE

[76] Inventor: Ugo Mancini, 334 Church St., Mountain View, Calif. 94041

[21] Appl. No.: 291,388

[22] Filed: Aug. 10, 1981

[51] Int. Cl.³ .......................... A21C 3/10; A21C 9/08
[52] U.S. Cl. .................................. 425/91; 99/450.2; 425/96; 425/100; 425/297; 425/308; 425/311; 425/325; 425/369; 425/374; 425/377; 426/502; 426/503
[58] Field of Search ................... 425/90, 91, 377, 296, 425/297, 302.1, 317, 305.1, 308, 311, 324.1, 325, 376 R, 202, 96, 100, 106, 369, 374; 99/450.2, 426, 430, 439; 426/496, 502, 503, 512

[56] References Cited

U.S. PATENT DOCUMENTS

| | | | |
|---|---|---|---|
| 1,730,932 | 10/1929 | Glisce | 425/317 |
| 2,479,864 | 8/1949 | Rhodes | 426/502 |
| 2,888,888 | 6/1959 | Jorgenson et al. | 426/502 |
| 3,451,822 | 6/1969 | Fast et al. | 426/512 |
| 3,694,220 | 9/1972 | Pierce | 426/512 |
| 4,068,570 | 1/1978 | Lanoie | 99/353 |

Primary Examiner—Willard E. Hoag
Attorney, Agent, or Firm—Paul L. Hickman

[57] ABSTRACT

A food preparation machine primarily designed for the production of the Italian potato based delicacy gnocchi and characterized by an inclined flouring ramp, a motor driven roller located under the lower end of the ramp, a deflection plate located proximate the roller, and a dough extruder for depositing dough plugs near the top of the ramp so that they roll and slide down the ramp into abutment with the deflection plate and the roller. As the roller is rotated the dough plugs are squeezed through a gap between the roller and the lower edge of the deflection plate to take on the characteristic form of gnocchi. A flouring mechanism is provided to flour the parts of the machine that come into contact with the dough, including the ramp and a rotating knife blade which cuts the extruded dough into the plugs. The roller is threaded from both ends with opposing threads so that the plugs are urged towards the center of the roller as it is rotated.

10 Claims, 7 Drawing Figures

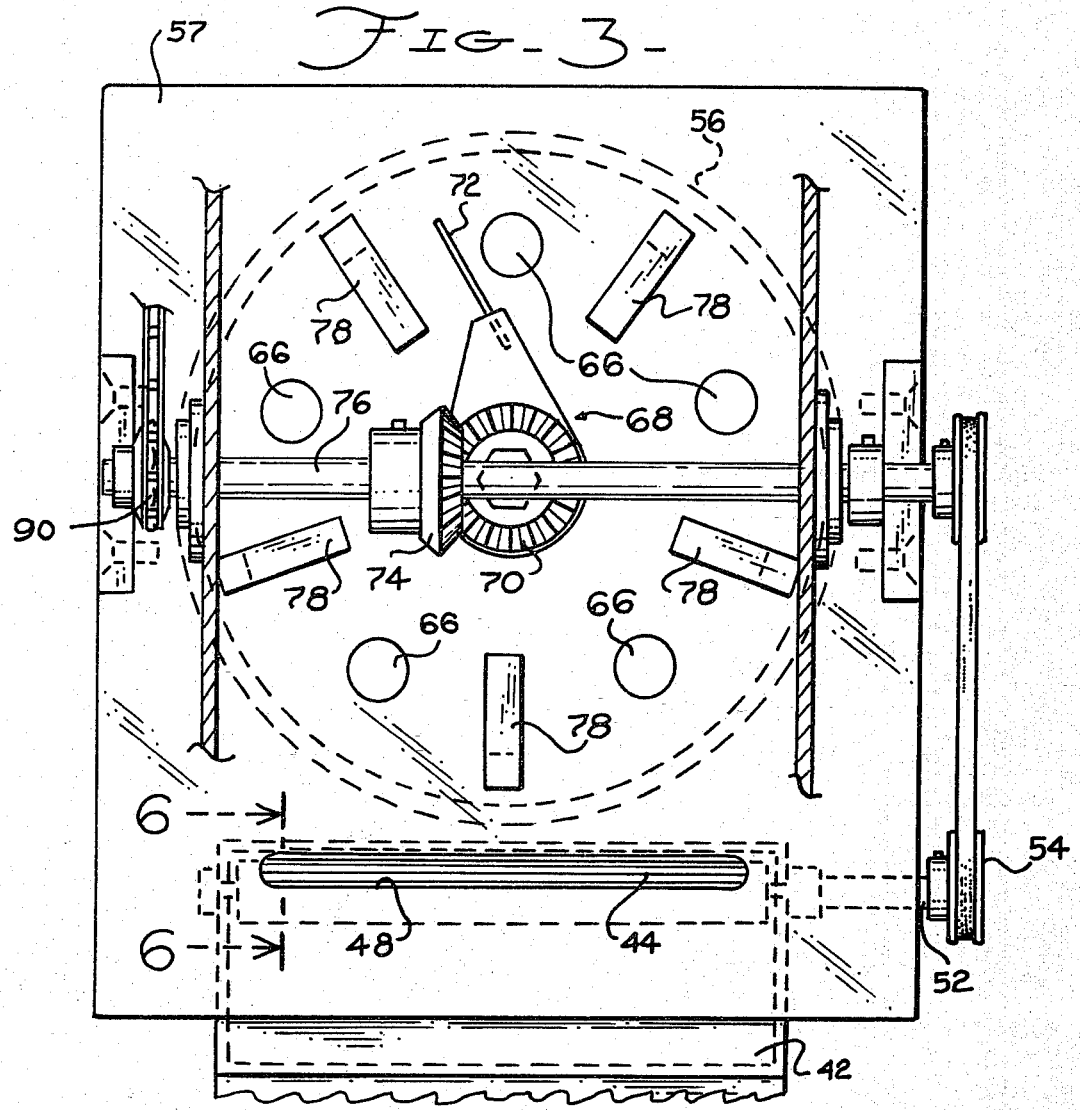
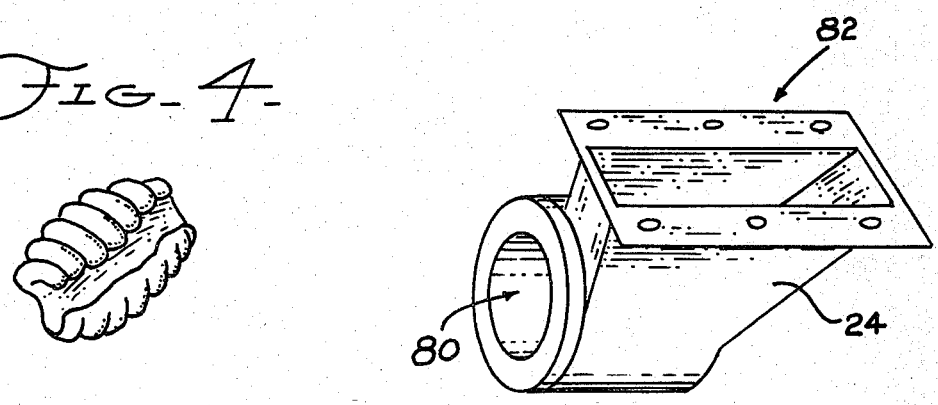

FOOD PREPARATION MACHINE

BACKGROUND OF THE INVENTION

1. Field of the Invention

This invention relates generally to food preparation machines and more particularly to machines which mass produce pastas and the like.

2. Description of the Prior Art

Gnocchi is an Italian delicacy made from potato dough. While gnocchi can have a variety of shapes, it most commonly takes the form of an elongated, thickened half-shell having a scalloped exterior. The gnocchi can be served plain or with a sauce.

While a number of prior art patents disclose devices that are designed to produce flour based foodstuffs such as noodles, ravioli, and the like, there is no known machine designed to produce gnocchi. Most machines designed to produce flour based products cannot be used to produce potato based products because potato dough is stickier, less malleable, more tender, and thicker than flour dough.

A typical machine for preparing flour based noodles is described in U.S. Pat. No. 1,730,932 of Glisce and includes a dough hopper, a ram for forcing the dough down a tube, a knife for cutting the dough into cube shaped pellets which fall onto a ramp, and a roller for shaping the pellets into spiral shaped noodles. Other machines, such as that described in U.S. Pat. No. 4,068,570 of Lanoie provide plugs of solidified egg by hydraulically extruding the processed eggs from an apertured cylinder and then slicing the eggs with rotary cutter blades.

The above cited devices and other devices of a similar nature would not function well with a potato based dough because the dough would tend to stick to the transport ramps and to all moving parts of the machine that it came into contact with. Furthermore, since potato dough is not as malleable or cohesive as flour dough it cannot be processed in the same way as flour dough is.

SUMMARY OF THE INVENTION

An object of this invention is to provide a machine which produces gnocchi in an efficient and economical manner.

Another object of this invention is to provide a machine with an improved flouring system which evenly coats the gnocchi with flour and which cleans and lubricates the parts of the device which come into contact with the gnocchi dough.

Yet another object of this invention is to provide a gnocchi roller which minimizes jamming problems.

Briefly, the invention includes a flouring ramp, a roller located beneath the lower end of the flouring ramp, a deflection plate for deflecting plugs of gnocchi dough against the roller, an apparatus for depositing dough plugs near the top of the ramp, and drive means for rotating the roller so that the dough plugs are forced through a small gap between the roller and the lower end of the deflecting plate. Also disclosed is a flouring system including a flour hopper provided with a long, narrow bottom-slot, and a metering device located rotatably supported over the bottom-slot. In operation, a continuous stream of flour flows down the ramp and over the roller.

The apparatus for depositing dough plugs includes a dough containment cylinder having a base provided with a number of extrusion apertures. Pressure is applied to the dough by a hydraulic piston, and a rotating knife blade attached to the base of the cylinder cuts the extruded dough into small cylindrical plugs. Holes are provided through the flouring ramp under the knife blade, and a blower is attached under the ramp holes to blow a portion of the flour flowing down the ramp up to clean and lubricate the knife blade.

The roller is threaded along part of its length, and is opposingly threaded along the remainder of its length. The threads produce the characteristic scallops on the outer surface of the gnocchi and minimize the likelihood of jamming.

An advantage of this invention is that a uniform gnocchi product can be quickly, easily, and economically produced.

Another advantage of this invention is that the flouring system eliminates most of the problems caused by the stickiness of gnocchi dough.

A still further advantage of this invention is that the opposingly threaded roller minimizes the problem of dough jamming between the ends of the roller and the support structure of the machine.

These and other objects and advantages of the present invention will no doubt become apparent upon a reading of the following descriptions and a study of the several figures of the drawing.

BRIEF DESCRIPTION OF THE DRAWING

FIG. 2a is a view of the roller 18 of FIG. 1.

FIG. 2b is a simplified operational view of the roller portion of the device.

FIG. 3 is a view taken along line 3—3 of FIG. 1.

FIG. 4 is a perspective view of a gnocchi made by this machine.

FIG. 5 is a perspective view of the blower 24 of FIG. 1.

FIG. 6 is a cross-sectional view taken along line 6—6 of FIG. 3.

DETAILED DESCRIPTION OF THE PREFERRED EMBODIMENT(S)

Figure 1:
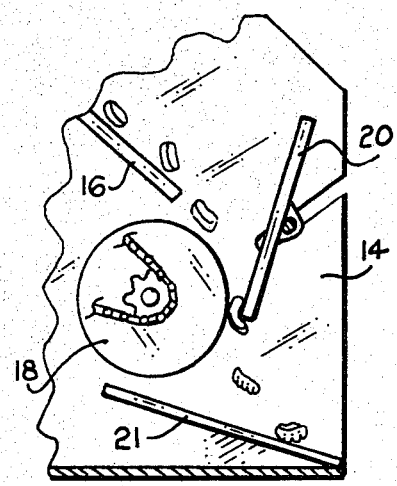
FIG. 1 is a partially broken, partially phantomed perspective view of a food preparation machine in accordance with the present invention.
Figure 1:
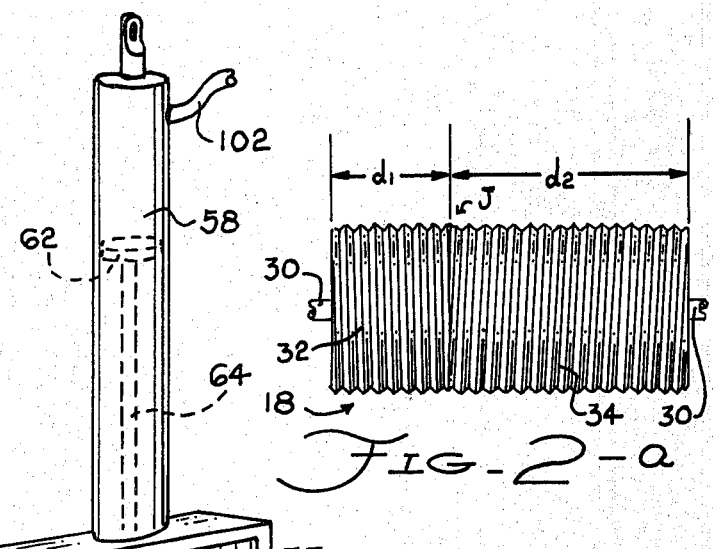
Figure 1:
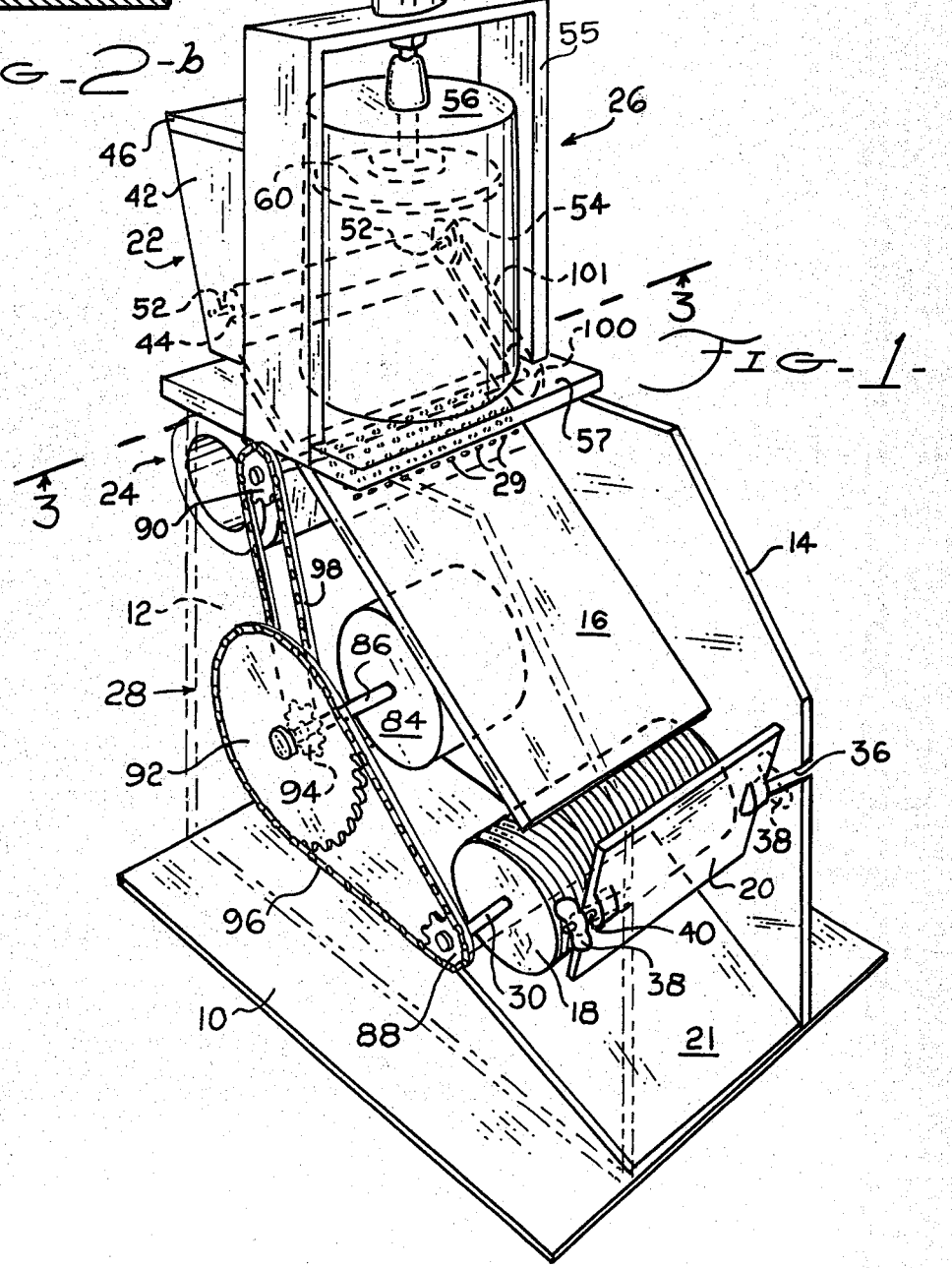

Referring to FIG. 1, a preferred embodiment of the present invention includes a base 10, a pair of sidewalls 12 and 14, a flouring ramp 16 angularly attached between the sidewalls, a roller 18 located near the lower end of the ramp, a deflection plate 20 located near the roller for deflecting matter traveling down the ramp against the roller, an output ramp 21, a flouring mechanism 22 including a blower 24, a dough plug producing mechanism 26, and a powering mechanism 28. The present machine is fully automatic, i.e. when it is powered it will produce gnocchi continuously until it runs out of flour and dough.

The base and sidewalls are preferably made from 3/16" aluminum plate, and may be welded or fastened together. The base typically measures about 24" by 24", and the sidewalls typically have maximum measurements of 24" by 26". The base and sidewall assembly provide a strong, lightweight support frame for the remainder of the machine.

Flouring ramp 16 is an elongated, rectangular member and is also preferably made from plate aluminum. It attaches to sidewalls 12 and 14 at an incline so that plugs of dough produced by mechanism 26 will roll and slide down the ramp to the roller and deflection plate. The ramp is provided with a number of small holes 29.

With additional reference to FIG. 2a, the roller is an elongated cylinder having an axial shaft 30. The curved surface of the roller is provided with opposing threads 32 and 34 which meet at a juncture J. Threads 32 are reverse threads and extend inwardly from the left end of the roller a distance d1, and threads 34 are standard threads and extend inwardly from the right end of the roller a distance d2. Typically the ratio of d1 to d2 is 1:2, but this can vary upwardly or downwardly.

Deflection plate 20 is pivotally attached to slots 36 of the sidewalls by wing nuts 38 and threaded studs 40. The angle of the plate relative the roller and the distance of the lower edge of the deflection plate from the roller can be adjusted to produce different shapes of gnocchi. As seen in FIG. 2b, the gnocchi is formed by coaction between the roller 18 and the lower portion and edge of plate 20. The formed gnocchi drop to ramp 21.

With additional reference to FIGS. 3, 5, and 6, the flouring mechanism 22 includes the blower 24, a flour hopper 42, and a metering device 44. The hopper has a hinged lid 46 and is provided with a long, narrow slot 48 in its lowermost surface.

The metering device is a long, cylindrical structure provided with axial fluting 50 on its curved surface. The device includes an axial shaft 52 which rotatably couples the cylindrical structure within the hopper and over slot 48. A pulley 54 is attached to an end of shaft 52 which extends through the sidewalls of the hopper. As the metering device is rotated the flour within progressive flutes is metered out of the slot. The metering device further serves to agitate the flour within the hopper to dislodge any flour that might tend to cake along the sidewalls of the hopper.

Dough plug producing mechanism 26 includes an inverted, U shaped frame 55, a dough containment cylinder 56 attached to a plate 57, a hydraulic cylinder 58, a pair of pistons 60 and 62 disposed within cylinders 56 and 58, respectively, and a rod 64 connecting the pistons. As seen in FIG. 3, the plate 57 under the dough containment cylinder 56 is provided with a number of apertures 66 through which the dough can be extruded. Rotatably coupled to the bottom of cylinder 56 is a knife assembly including a body portion 68 having a bevel gear 70, and a blade portion 72 extending substantially radially from the body portion. The gear 70 is engaged by a bevel gear 74 supported on a rotatable shaft 76. As the blade portion sweeps past the apertures 66 the extruded dough is cut into short, cylindrical plugs which fall to the flouring ramp. A number of brushes 78 are provided to clean the blade portion as it sweeps by.

As best seen in FIG. 5, the blower includes a squirrel cage portion 80 and a flanged exhaust portion 82. Rreferring back to FIG. 1, the flanged portion 82 is attached to the lower surface of flouring ramp 16 directly beneath holes 29. When powered, the blower blows a portion of the flour that is sliding down the ramp up to blade 72 and the brushes to prevent potato dough from sticking to the blade.

The powering mechanism 28 includes a fractional horsepower electric motor 84 having a shaft 86, and a number of sprockets 88, 90, 92, and 94 attached to shafts 30, 76, 86, and 86, respectively. A drive chain 96 connects large sprocket 92 to sprocket 88, and a drive chain 98 connects sprocket 94 to sprocket 90. Lastly, a pulley 100 is attached to an end of shaft 76, and a V belt 101 couples pulley 100 to pulley 54. Blower 24 is preferably independently powered.

To use the present device, the hopper 42 is filled with rice or wheat flour and the dough containment cylinder is filled with potato dough. Motor 84, blower 24, and a hydraulic pump (not shown) connected to inlet 102 of the hydraulic cylinder are actuated simultaneously. Flour is continuously metered out of the hopper and flows down the ramp 16 in an even layer. A portion of the flour flowing down the ramp is blown up to the blade of the knife to keep it clean and lubricated. Dough extruded through the apertures in plate 57 are cut into small, cylindrical plugs by the rotating blade 72 which then drop to the upper surface of the flouring ramp. As the plugs of dough roll and slide down the ramp they become thoroughly covered with flour which prevents them from sticking to the ramps, deflection plate, roller, and each other.

When the plugs of dough fall off the end of the flouring ramp they are either drawn or deflected to the small gap between the roller and the deflection plate. As the plugs are squeezed through the gap as seen in FIG. 2b they are streched, rolled, curled, and scalloped to the classic gnocchi shape illustrated in FIG. 4. The threads of the roller produce the scallops on the outside of the gnocchi. The roller is provided with opposing threads because it was found that if, for example, only threads 34 were provided all the way across the roller, some of the plugs would travel down the roller and jam against sidewall 12 or would be forced together to produce double gnocchis. By reverse threading a short length of the roller these axially moving plugs are urged back towards the center of the roller. Providing reverse threads along approximately ⅓ of the length of the roller was found to be a good compromise between uniformity of the scallops on the gnocchi and minimizing the excessive axial travel of the dough plugs.

The angle of the deflection plate and the gap width between the plate and the roller can be adjusted to vary the shape of the produced gnocchi. Furthermore, the hydraulic pressure on cylinder 58 and, to some extent, the speed of rotation of the knife blade can be varied to change the size of the gnocchi. Also, plate 57 can be replaced with one with larger, smaller, or differently shaped extrusion apertures to vary the side and shape of the gnocchi.

After the gnocchi are formed they fall down to output ramp 21, which is also heavily covered with flour falling down from the flouring ramp and the roller. The gnocchi and excess flour are then collected in appropriate containers (not shown). The flour can be recycled through the system.

While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. A food preparation machine comprising:
(a) a flouring ramp having an upper end, a lower end, an upper surface, and a lower surface;

(b) a roller located under said lower surface proximate said lower end of said flouring ramp;

(c) a deflection plate having a lower end spaced from said roller to provide a gap;

(d) means for depositing dough plugs on said upper surface of said ramp proximate said upper end, whereby said plugs may roll and slide down and then off the end of said ramp, and come into abutment with said deflection plate and roller; and (e) means rotating said roller so that said plugs abutting said deflection plate and said roller are forced through said gap.

2. A food preparation machine as recited in claim 1 wherein said roller is threaded along the greater portion of its length.

3. A food preparation machine as recited in claim 2 wherein said roller is threaded in a first direction along a first length of said roller, and in a second, opposing direction along a second length of said roller, whereby said plugs of dough are urged towards the juncture of said opposing threads when said roller is rotated.

4. A food preparation machine as recited in claim 1 wherein said means for depositing dough plugs includes dough containment means provided with at least one extrusion aperture, means for applying pressure to dough stored within said container to cause said dough to extrude from said aperture, and means for severing said extruded dough into a plurality of said dough plugs.

5. A food preparation machine as recited in claim 4 further comprising means for flouring said upper surface of said flouring ramp.

6. A food preparation machine as recited in claim 5 wherein said means for flouring said upper surface of said flouring ramp includes a flour hopper, and means for metering flour from said hopper onto said upper surface of said track.

7. A food preparation machine as recited in claim 6 wherein said means for metering said flour comprises an elongated, fluted cylinder, and means for rotating said cylinder over a slot provided in the bottom of said hopper.

8. A food preparation machine as recited in claim 6 wherein said means for severing said extruded dough includes a rotatable knife secured proximate said extrusion aperture having a blade which sweeps across said aperture to sever said dough.

9. A food preparation machine as recited in claim 8 further comprising means for flouring said blade.

10. A food preparation machine as recited in claim 9 wherein said means for flouring said blade includes a blower having an outlet disposed below said lower surface of said flouring ramp, and a plurality of apertures provided through said flouring ramp above said outlet, whereby flour from said ramp is blown against said blade.

* * * * *